April 11, 1944. A. B. KYLE 2,346,539
BRAKE APPARATUS
Filed Aug. 18, 1943
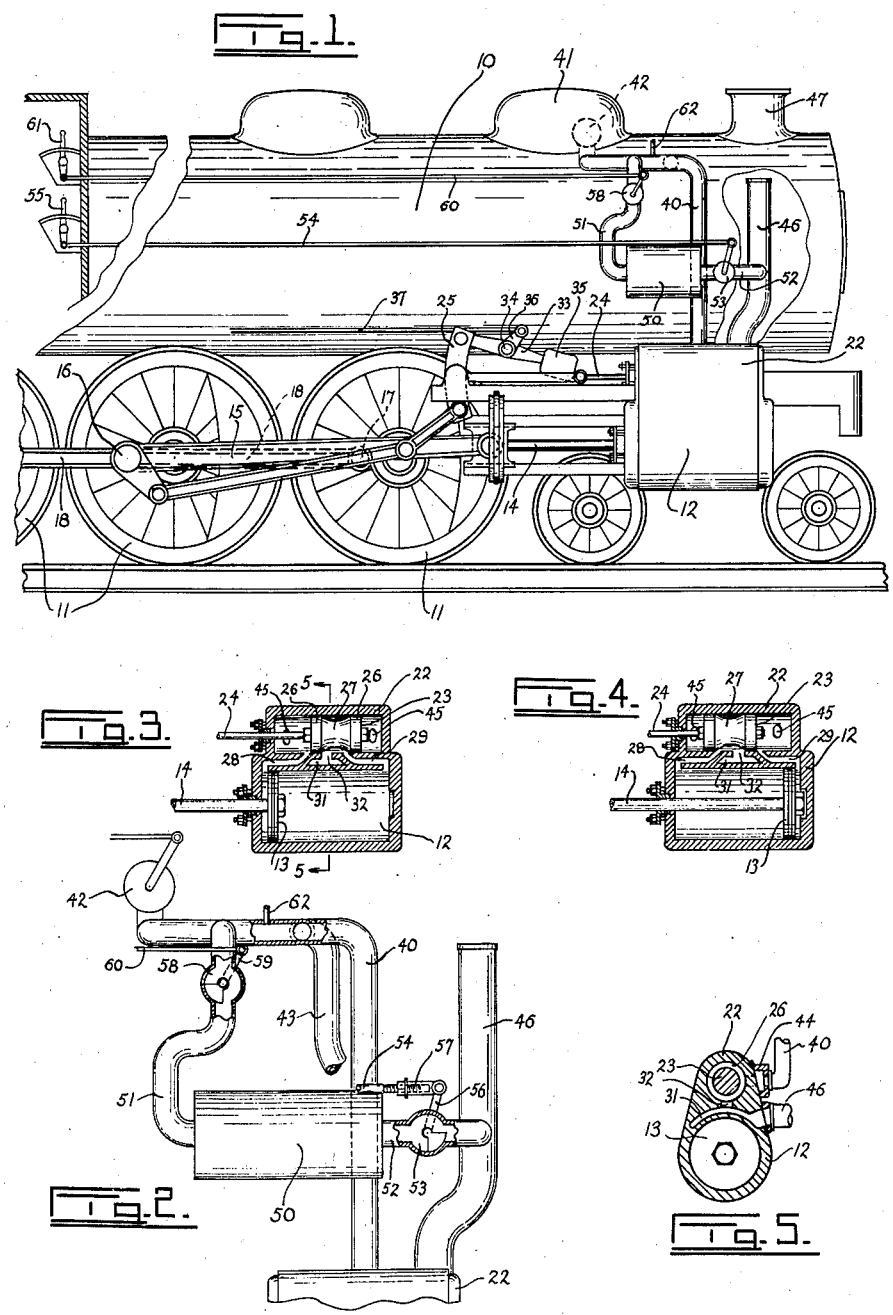
INVENTOR.
ARTHUR BLACK KYLE.
BY Featherstonhaugh & Co
ATTORNEYS.

Patented Apr. 11, 1944

2,346,539

UNITED STATES PATENT OFFICE 2,346,539

BRAKE APPARATUS

Arthur Black Kyle, Vancouver, British Columbia, Canada

Application August 18, 1943, Serial No. 499,135

6 Claims. (Cl. 188—99)

This invention relates to a brake apparatus for locomotives and the like.

An object of the present invention is the provision of brake apparatus for locomotives which may be used alone or, preferably, in conjunction with the usual brakes thereof.

Another object is the provision of apparatus for braking the wheels of a locomotive without causing any extra wear.

Another object is the provision of braking apparatus which is not very likely to wear out or become defective.

A further object is the provision of extremely simple apparatus by means of which the driving pistons of a locomotive are utilized to brake the engine.

With these and other objects in view, the present invention consists essentially of braking apparatus for a locomotive having a cylinder with a driving piston therein, a steam chest with a piston valve for controlling the driving piston, and reversing mechanism; which comprises a supply pipe for directing steam to the chest, a throttle valve in said pipe, means for operating the throttle valve, an exhaust pipe for removing exhaust steam from the chest, means connecting the supply pipe to the exhaust pipe, and means for controlling the air directed into the exhaust pipe as said air is pumped thereinto by the driving piston when the throttle valve is closed and the piston valve has been put into reverse, as more fully described and illustrated by way of example in the following specification and the accompanying drawing, in which Figure 1 is a side elevation of a locomotive with the brake apparatus in place, Figure 2 is an enlarged elevation of the brake apparatus alone and partly in section, Figure 3 is a reduced longitudinal section through a cylinder and its steam chest of the locomotive, Figure 4 is a similar view to Figure 3 with the driving piston and the piston valve in opposite positions, and Figure 5 is a section taken substantially on the lines 5—5 of Figure 3.

Referring more particularly to the drawing, 10 is an ordinary locomotive having driving wheels 11, and a power cylinder 12 with a driving piston 13 therein. This piston has a piston rod 14 which extends through the end of the cylinder and is pivotally attached to a connecting link 15, which, in turn, is pivotally connected to a crank pin 16 on one of the wheels. This pin is connected to similar crank pins 17 on the other driving wheels by means of links 18.

A steam chest 22 is mounted on top of the cylinder 12 and has a piston valve 23 operating therein. A piston rod 24 extends through the end of the chest from the valve 23 and is connected to the reversing link 25 of the engine, which operates in the usual manner. The piston valve has cylindrical sections 26 at its opposite ends and the middle section 27 is concave. Passages 28 and 29 extend from the interior of the chest adjacent the ends of the piston valve to the opposite ends of the cylinder, and an exhaust chamber 31 is formed between the chest and the cylinder substantially midway between the ends thereof and communicates with the interior of the former by means of a port 32.

The link 25 is connected at its upper end to an arm 33 which is mounted on a pivot 34 and has a counterweight 35 on its opposite end. A crank 36 is attached to the arm 33 at its pivot, said crank being connected to a rod 37 which is reciprocated when desired by suitable mechanism (not shown).

It will be understood that all the apparatus described so far is normal locomotive equipment which functions in the usual manner and, therefore, does not require any further explanation. This equipment is duplicated on the other side of the locomotive.

A supply pipe 40 directs steam to the chest 22 from the dome 41 of the locomotive and has a throttle valve 42 therein controlled in any suitable manner from the cab of the locomotive. Figure 2 shows a branch supply pipe 43 which extends from the pipe 40 to the chest on the other side of the locomotive. The pipe 40 actually communicates with a T 44, see Figure 5, which is connected by ports 45 to the interior of the chest adjacent opposite ends thereof. An exhaust pipe 46 extends from the chamber 31 to the smoke stack 47 of the locomotive.

Suitable means is provided for connecting the supply pipe 40 to the exhaust pipe 46 and for controlling the movement of air therethrough. This may take the form of a pipe with a control valve therein, but it is preferable to provide an air tank 50 with inlet and outlet pipes 51 and 52 extending therefrom to the supply and exhaust pipes, respectively. The pipe 52 has a pressure valve 53 therein which is connected by a rod 54 to suitable operating means, such as a lever 55, in the locomotive cab. The arm 56 of this valve is preferably adjustably connected to the rod 54 in any desired manner, as at 57, in order that the valve may be set so that it cannot be completely closed. If desired, a control valve 58 may be mounted in the inlet pipe 51. The arm 59 of this valve is connected by a rod 60 to a suitable operating means, such as a lever 61, in the cab.

If no other means is available for oiling the piston and valve mechanism of the locomotive, an oil pipe 62 extending from a suitable source of supply (not shown), may discharge into the supply pipe 40 between the pipes 43 and 51.

During ordinary operation, steam supplied to the steam chest 22 by the pipe 40 reciprocates the driving piston 13 in the cylinder 12 to turn the wheels 11. The valve 58 is closed. The setting of the piston valve 23 in relation to the driving piston determines the direction of movement of the locomotive. With the setting in Figure 3, the piston valve 13 is clear of the passage 28 and covers the passage 29 so that steam entering the chest through the port 45 passes along the passage 28 to the interior of the cylinder 12 where it expands to drive the piston valve towards the opposite end of the cylinder. At the same time, the exhaust steam on the other side of the piston is forced through the passage 29, past the concave section 27 of the piston valve, and through the port 32 into the chamber 31, whence it passes out through the exhaust pipe 46. When the piston valve moves to uncover the passage 29 and cover the passage 28, as seen in Figure 4, this operation is reversed.

When it is desired to use this apparatus to brake the locomotive, the steam is shut off from the supply pipe 40, the steam chest 22 and the cylinder 12. Then the action of the piston valve 23 is reversed in relation to the driving piston in the usual manner and the valves 53 and 58 are opened. This reversal of the piston valve means that in Figure 3, the valve is just about to open the passage 29 and cover the passage 28 to bring the latter into communication with the exhaust chamber 31. As the driving piston is moved along the cylinder by the rotation of the wheels 11, air is forced through the passage 29, the steam chest, port 45 and T 44 into the pipe 40. At the same time, the opposite side of the piston draws air into the cylinder through the exhaust pipe 46, chamber 31, port 32 and passage 28. On the return of the piston, the piston valve has moved into the position shown in Figure 3 and this air is forced out through the passage 28, steam chest, port 45 and T 44 into the supply pipe. Simultaneously, air is being drawn in through the exhaust pipe, chamber 31, port 32 and passage 29.

The air pumped into the supply pipe passes through pipe 51, tank 50, pipe 52 and into the exhaust pipe. This movement of air is controlled by means of the pressure valve 53. As this valve is closed, pressure is built up in the tank, creating a back pressure which opposes the movement of the driving piston. If the pressure valve were completely closed, the air pressure would build up to a point where the piston could not move, thus locking the driving wheels 11. As this is undesirable, it is advantageous to set the pressure valve so that it cannot close completely and so that in its most restricted setting it would permit just sufficient air to pass to prevent the wheels from locking.

This back pressure opposing the movement of the piston tends to stop the driving wheels from turning, thus braking the locomotive. This braking is obtained without causing wear in any of the parts, which is directly opposite to the known types of brake. It is thought that this apparatus will brake up to the point of skidding the wheels, the same load that the engine will pull without skidding the wheels. It is not suggested, however, that the ordinary brake apparatus of a locomotive or train be eliminated when this apparatus is used, but the latter may be used in conjunction with the present equipment greatly to reduce its load and, therefore, to prolong the life thereof. Under ordinary circumstances, the entire train may be brought to a stop or eased down a grade by the use of this apparatus alone, thus saving the brake shoes throughout the train. In case of emergency, the usual brake system may be used along with the apparatus.

One of the features of this invention is that when the braking apparatus is in operation, substantially the same air is repeatedly circulated through the system. The air tank discharges into the exhaust pipe and the air is drawn back into the cylinder. This air is warm so that the cylinder does not become cold when the brakes are applied for a relatively long time, such as when the locomotive is going down a long grade. The recirculation of the same air prevents to a great extent any smoke or cinders from being drawn through the exhaust pipe into the cylinder.

When the braking apparatus is in operation, it is helpful to open the throttle valve slightly. In this case, the driving piston pumps air against the steam pressure of the locomotive, thus increasing the resistance to the movement of the piston. Furthermore, the steam helps to keep the cylinder warm and it lubricates the latter. This is an important feature because the cylinder would be without proper lubrication when the brakes were applied, particularly on long down grades.

Various modifications may be made in this invention without departing from the spirit thereof or the scope of the claims and, therefore, the exact forms shown are to be taken as illustrative only and not in a limiting sense, and it is desired that only such limitations shall be placed thereon as are disclosed in the prior art or are set forth in the accompanying claims.

What I claim as my invention is:

1. Brake apparatus for a locomotive having a cylinder with a driving piston therein, a steam chest with a piston valve for controlling the driving piston, and reversing mechanism; which comprises a supply pipe for directing steam to the chest, a throttle valve in said pipe, means for operating the throttle valve, an exhaust pipe for removing exhaust steam from the chest, means connecting the supply pipe to the exhaust pipe, and means for controlling the air directed into the exhaust pipe as said air is pumped thereinto by the driving piston when the throttle valve is closed and the piston valve has been put into reverse.

2. Brake apparatus for a locomotive having a cylinder with a driving piston therein, a steam chest with a piston valve for controlling the driving piston, and reversing mechanism; which comprises a supply pipe for directing steam to the chest, a throttle valve in said pipe, means for operating the throttle valve, an exhaust pipe for removing exhaust steam from the chest, means connecting the supply pipe to the exhaust pipe, a pressure valve in the connecting means, and means for operating the pressure valve, said pressure valve being adapted to control the air directed into the exhaust pipe as said air is pumped thereinto by the driving piston when the throttle valve is closed and the piston valve has been put into reverse.

3. Brake apparatus for a locomotive having a cylinder with a driving piston therein, a steam chest with a piston valve for controlling the driving piston, and reversing mechanism; which comprises a supply pipe for directing steam to the chest, a throttle valve in said pipe, means for operating the throttle valve, an exhaust pipe for removing exhaust steam from the chest, an air tank, means connecting the tank to the supply and exhaust pipes, and means for controlling the pressure in the tank as air is pumped thereinto by the driving piston when the throttle valve is closed and the piston valve has been put into reverse.

4. Brake apparatus for a locomotive having a cylinder with a driving piston therein, a steam chest with a piston valve for controlling the driving piston, and reversing mechanism; which comprises a supply pipe for directing steam to the chest, a throttle valve in said pipe, means for operating the throttle valve, an exhaust pipe for removing exhaust steam from the chest, an air tank, an inlet pipe connecting the tank to the supply pipe, and outlet pipe connecting the tank to the exhaust pipe, a pressure valve in the outlet pipe, and means for operating the pressure valve, said pressure valve being adapted to control the pressure in the tank as air is pumped thereinto by the driving piston when the throttle valve is closed and the piston valve has been put into reverse.

5. Brake apparatus for a locomotive having a cylinder with a driving piston therein, a steam chest with a piston valve for controlling the driving piston, and reversing mechanism; which comprises a supply pipe for directing steam to the chest, a throttle valve in said pipe, means for operating the throttle valve, an exhaust pipe for removing exhaust steam from the chest, an air tank, an inlet pipe connecting the tank to the supply pipe, a control valve in the inlet pipe, means for operating the control valve, an outlet pipe connecting the tank to the exhaust pipe, a pressure valve in the outlet pipe, and means for operating the pressure valve, said control and pressure valves being adapted to control the pressure in the tank as air is pumped thereinto by the driving piston when the throttle valve is closed and the piston valve has been put into reverse.

6. A device according to claim 5 including means for preventing the pressure valve from being completely closed.

ARTHUR BLACK KYLE.